Nov. 24, 1936.  E. F. H. GROTHE  2,061,573
STORAGE BATTERY AND GRAVITY INDICATING MEANS
Filed Jan. 18, 1933
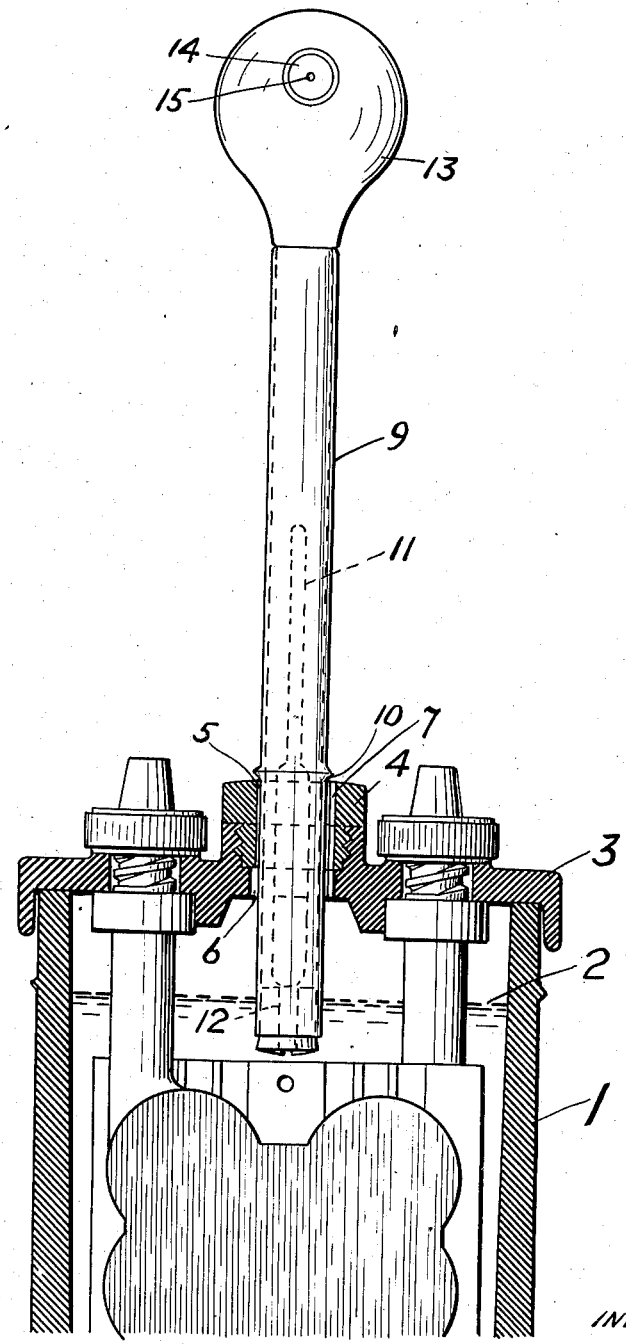
WITNESS:
INVENTOR
Ernest F.H. Grothe
BY
Augustus B Stoughton
ATTORNEY.

Patented Nov. 24, 1936

2,061,573

UNITED STATES PATENT OFFICE 2,061,573

STORAGE BATTERY AND GRAVITY INDICATING MEANS

Ernest F. H. Grothe, Philadelphia, Pa., assignor to The Electric Storage Battery Company, Philadelphia, Pa., a corporation of New Jersey Application January 18, 1933, Serial No. 652,298

1 Claim. (Cl. 136—182)

The subject of my invention is an electric storage battery cell having a hydrometer syringe containing means for indicating the specific gravity of the electrolyte of the storage battery therein. The hydrometer syringe is removably mounted in the vent plug of the storage battery.

One feature of my invention is that the barrel of the syringe fits loosely in the opening through the vent plug and the barrel itself has a shoulder or collar formed integrally with the material of the barrel which shoulder supports the syringe on the vent plug.

Another feature is that there is a vent opening through the vent plug at one side of the opening which contains the barrel of the hydrometer syringe.

For a further exposition of my invention reference may be had to the annexed specification and drawing at the end whereof my invention will be specifically pointed out and claimed.

The single figure of the drawing is a view in side elevation with parts in vertical cross section and with parts broken away.

In the drawing there is shown a storage battery having a casing generally indicated at 1 and adapted to contain the customary electrolyte indicated at 2. The casing 1 supports a cover 3 which is connected to the casing 1 so that no gas escapes therebetween. Casing 1 and cover 3 together form a container for the storage battery and its electrolyte 2.

Cover 3 carries a vent plug 4 thereon. Vent plug 4 has a large hole 5 extending therethrough and cooperating with a hole 6 in cover 3. Adjacent hole 5 in vent plug 4 is a vent opening 7 which communicates below with the interior of the cell through the hole 6.

Through holes 5 and 6 extends the barrel 9 which forms part of a hydrometer syringe. Barrel 9 is preferably made of glass or other transparent, acid resistant material. Barrel 9 has on its outer surface a collar 10 formed integral with the material of the barrel and of somewhat larger diameter than hole 5.

Within barrel 9 there is located means 11 for indicating the specific gravity of the electrolyte 2 of the storage battery when the same is drawn into the barrel 9 through the opening 12 in the bottom of the barrel.

At its upper end barrel 9 carries a bulb 13 conveniently made of rubber or other flexible, acid resistant material. Bulb 13 carries a boss 14 thereon. In the center of boss 14 there is located a permanently open hole 15.

It is to be noted that barrel 9 fits loosely in holes 5 and 6 and is supported on vent plug 4 by the engagement of collar or shoulder 10 with the top of the vent plug.

Vent opening 7 permits the escape of gas from the cell when the syringe is in the position shown. Vent opening 7 prevents the spitting of electrolyte which would otherwise occur at the top of the space between collar 10 on barrel 9 and vent plug 4. This space being comparatively small acts by capillary action to retain a film of electrolyte which is sprayed from the surface of the electrolyte in the cell during the gassing period and accumulates on the under surface of the cover 3 and vent plug 4, and on the surface of barrel 9. It is found that the separate vent opening 7 prevents this spitting.

When it is desired to draw electrolyte 2 into barrel 9, bulb 13 is pressed, as may conveniently be done by hand, with opening 15 open to permit the escape of air or other gas from within the bulb 13. Opening 15 is then closed, as by covering it with the hand, and the bulb 13 permitted to expand thus drawing electrolyte 2 from the casing 1 through the opening 12 into the barrel 9 and floating the indicating means 11 in the electrolyte. When the opening 15 is again uncovered the electrolyte in barrel 9 drains back into the cell.

If desired, vent plug 4 and cover 3 can be combined into one integral structure.

I do not intend to be limited to the practice of my invention save as the scope of the prior art and of the attached claim may require.

I claim:

An indicating device including, in combination, a storage battery containing electrolyte, a vent plug having a hole therethrough mounted on said storage battery, a hydrometer syringe having a glass barrel loosely fitting in said hole so that said syringe is detachably mounted in said vent plug, a shoulder formed of the glass of said barrel intermediate the ends thereof and supporting said syringe in said vent plug so that the major portion of said barrel is outside the battery and is visible, said vent plug having a vent opening therethrough located between said barrel and the wall of said hole and underlying said shoulder so that said vent opening is open when said syringe is in said vent plug, means in said syringe for indicating the specific gravity of the electrolyte, and a bulb of flexible, acid-resistant material on the barrel of said syringe.

ERNEST F. H. GROTHE.